US006713535B2

(12) United States Patent
Orkin et al.

(10) Patent No.: US 6,713,535 B2
(45) Date of Patent: Mar. 30, 2004

(54) LOW-FRICTION CHROMATE-FREE COATING OF EPOXY RESINS AND SULFONYLDIANILINE

(75) Inventors: Stanley Orkin, Vernon, CT (US); Glenn Greenberg, Avon, CT (US)

(73) Assignee: Turbine Controls, Inc., Bloomfield, CT (US)

( * ) Notice: Subject to any disclaimer, the term of this patent is extended or adjusted under 35 U.S.C. 154(b) by 158 days.

(21) Appl. No.: 10/085,790

(22) Filed: Feb. 28, 2002

(65) Prior Publication Data

US 2003/0162872 A1 Aug. 28, 2003

(51) Int. Cl.⁷ .............. C08K 3/10; C08K 3/36; C08G 59/52; C08L 63/02
(52) U.S. Cl. ............ 523/428; 525/65; 525/113; 525/526
(58) Field of Search ............ 523/428; 525/65, 525/113, 526

(56) References Cited

U.S. PATENT DOCUMENTS

| | | | |
|---|---|---|---|
| RE29,092 E | 12/1976 | Schiefer et al. | 252/12.4 |
| 4,532,308 A * | 7/1985 | Sato et al. | 525/482 |
| 4,996,085 A | 2/1991 | Sievers | 427/140 |
| 5,171,622 A | 12/1992 | Wegner | 428/143 |
| 5,219,956 A | 6/1993 | Fukuoka | 525/526 |
| 5,316,790 A | 5/1994 | Chan et al. | 427/142 |
| 5,344,515 A | 9/1994 | Chenock, Jr. | 156/171 |
| 5,427,698 A * | 6/1995 | Hirokawa et al. | 508/106 |
| 5,432,211 A * | 7/1995 | Morita et al. | 523/435 |
| 5,554,020 A | 9/1996 | Rao et al. | 418/178 |
| 5,694,852 A | 12/1997 | Bressler et al. | 101/401.1 |
| 5,859,095 A * | 1/1999 | Moyle et al. | 523/402 |
| 5,942,563 A | 8/1999 | DeGraaf | 523/412 |
| 6,010,823 A | 1/2000 | Goto et al. | 430/280.1 |
| 6,013,730 A | 1/2000 | McGrail et al. | 525/113 |
| 6,020,069 A | 2/2000 | Antonelli et al. | 428/413 |
| 6,054,509 A | 4/2000 | Arai et al. | 523/428 |
| 6,090,869 A | 7/2000 | Orkin et al. | 523/433 |
| 6,098,711 A | 8/2000 | Chatterji et al. | 166/294 |
| 6,111,017 A | 8/2000 | Imashiro et al. | 525/123 |
| 6,127,460 A | 10/2000 | Kazuto | 523/440 |
| 6,171,418 B1 | 1/2001 | Caramanian | 156/64 |
| 6,177,490 B1 | 1/2001 | Yoda et al. | 523/547 |
| 6,180,723 B1 | 1/2001 | Keehan | 522/328.8 |
| 6,187,416 B1 | 2/2001 | Satoh et al. | 428/209 |
| 6,187,836 B1 | 2/2001 | Oxman et al. | 522/148 |
| 6,196,730 B1 | 3/2001 | Hammar | 385/76 |
| 6,207,766 B1 | 3/2001 | Doi et al. | 525/403 |
| 6,214,906 B1 | 4/2001 | Caramanian | 523/455 |
| 6,218,480 B1 | 4/2001 | Rappoport | 525/459 |
| 6,224,710 B1 * | 5/2001 | Rinde et al. | 156/310 |
| 6,232,426 B1 | 5/2001 | Orikabe et al. | 528/91 |
| 6,242,083 B1 | 6/2001 | McGrail et al. | 428/297.4 |
| 6,244,344 B1 | 6/2001 | Chatterji et al. | 166/295 |
| 6,270,751 B1 | 8/2001 | Resler | 424/61 |
| 6,284,322 B1 | 9/2001 | Nazaryan et al. | 427/386 |
| 6,294,597 B1 | 9/2001 | Rinde et al. | 523/442 |
| 6,323,264 B1 | 11/2001 | Nazaryan et al. | 523/458 |
| 6,372,826 B1 | 4/2002 | Greenberg et al. | 523/435 |

FOREIGN PATENT DOCUMENTS

| | | | |
|---|---|---|---|
| EP | 687715 A2 | * | 12/1995 |
| JP | 3-2257 A2 | * | 1/1991 |
| JP | 3-192182 A2 | * | 8/1991 |
| WO | WO 85/00823 A1 | * | 2/1985 |

* cited by examiner

Primary Examiner—Robert Sellers
(74) Attorney, Agent, or Firm—Todd E. Garabedian; Wiggin & Dana LLP

(57) ABSTRACT

The present invention is directed to a low-friction coating composition, comprising: about 10 to about 30 wt % of an epoxy resin composition consisting essentially of 4-glycidyloxy-N,N'-diglycidylaniline; about 30 to about 60 wt % of an epoxide resin composition consisting essentially of bisphenol A diglycidyl ether polymer; and about 20 to about 40 wt % of an aromatic amine composition consisting essentially of 4,4'-sulfonyldianiline; wherein all weight percents are based on the total weight of the low-friction coating composition, and wherein the low-friction coating composition is substantially free of chromate. The invention is also directed to a substrate coated with the above low-friction coating composition, and methods of coating a substrate with the low-friction coating composition.

16 Claims, No Drawings

LOW-FRICTION CHROMATE-FREE COATING OF EPOXY RESINS AND SULFONYLDIANILINE

BACKGROUND OF THE INVENTION

1. Field of the Invention

The present invention is directed to self-lubricating coating compositions, and more particularly to self-lubricating coating compositions made from two specific resins and a specific aromatic amine, and wherein the composition is substantially free of chromate.

2. Brief Description of the Related Art

Low-friction coatings are useful in a wide variety of industrial applications to provide movable linkages or reciprocating parts with a low friction interface without the need for lubrication by grease, oil, or other lubricant. Low-friction coating compositions also provide high load capability with lower resistance than exhibited by metal/metal bearing contact, as well as having a relatively long life. In particular, low friction coatings have proven useful in aircraft and other industrial equipment, where severe operating conditions can occur. For example, aircraft fuel and oil pump mechanisms require repair because their gear drive bushings wear away during use. This wear (called "galling" or "scoring" or "gear wiping") limits the longevity of the pump mechanism and results in costly rebuilding, repair, or replacement of the moving components of the mechanisms. Low-friction coating compositions have also been used on reciprocating parts, such as engine pistons, where a low-friction interface between the reciprocating part and its housing is required for optimum performance.

Under extreme conditions, the wear resistance of a low-friction or self-lubricating coating composition becomes a key factor in how that coating composition performs in any particular application. Many low-friction or self-lubricating compositions available today do not have the wear resistance properties that are required for modern high-performance machinery parts made under close tolerances. Lack of wear-resistant properties in commercially available low friction coating compositions frequently results in premature degradation of the low-friction or self-lubricating coating. Without a wear resistant low friction coating, moving parts and/or linkages suffer accelerated wear which can result in costly replacement or complete failure of the parts. Therefore, efforts have been made to improve the wear resistance of low-friction or self-lubricating coatings.

Chromate is a know compound that is frequently used in self-lubricating compositions as a hardener or catalyst in the curing of epoxy resin systems at selected temperatures. However, chromate is also a known carcinogen, and efforts are being made to reduce or eliminate its use in epoxy resin systems. During preparation of a self-lubricating composition that contains chromate, it is possible that people may be exposed to the chromate, and could suffer toxic reactions. In addition, persons coming into contact with the self-lubricating coating after it has been applied are also susceptible to exposure to toxic chromate levels. U.S. Pat. No. 4,996,085 to Sievers discloses coating a pump housing surface with a composition comprising a hardenable epoxy resin, a reinforcing filler, and an agent having a lower coefficient of friction than the epoxy resin. Graphite may function as the reinforcing filler, and the frictional reducing agent may be either graphite, in fibrous or granulated form; fluorinated carbon (i.e., $(CF_x)$ wherein x<2); or molybdenum disulfide. Further, the preferred class of epoxy resin is a diglycidyl ether of a dihydric phenol (e.g., the diglycidyl ether of bisphenol A).

U.S. Pat. No. 5,316,790 to Chan et al. discloses a lubricative coating and filler material for restoring metal surfaces that have become scratched, scored, grooved, or otherwise damaged to a functional condition. This coating and filler material is a mixture of an epoxy resin, tungsten disulfide, and isopropyl alcohol in a ratio of 9:1:1.6.

U.S. Pat. No. 5,554,020 to Rao et al. discloses a high efficiency pump having relatively-moving parts constituted of a light weight material and a coating on at least one of the parts. The coating is comprised of solid lubricants in a polymer resin matrix stable up to 700° F. The solid lubricant may be graphite, molybdenum disulfide, boron nitride, tungsten disulfide, or polytetrafluoroethylene (PTFE). The resin matrix may be one of polyimides, epoxy, or polyaryl sulfone.

U.S. Pat. No. 6,090,869 to Orkin et al. discloses a curable composition useful as a self-lubricating coating and comprising an admixture of: (1) 40–60 wt % of a first one-component epoxy resin composition, comprising: (a) about 10–30% by weight of 4-glycidyloxy N,N-diglycidyl aniline; (b) about 30–60% by weight of an epoxy resin (an epichlorohydrin ether of bisphenol A); and (c) about 3–7% by weight of strontium chromate; (2) 5–20 wt % of a second one-component epoxy resin composition, comprising: (a) about 50% to about 90% by weight of an epoxy resin (a diglycidyl ether of bisphenol A); (b) about 5% to about 25% by weight of diethylene glycol monoethyl ether acetate; and (c) about 5% to about 25% by weight of p-t-butylphenyl glycidyl ether; (3) 2–30 wt % of di-epoxide reactive diluent; (4) 2–20 wt % polytetrafluoroethylene; (5) 2–20 wt % molybdenum disulfide; and (6) 0.5–13 wt % mica. The preferred self-lubricating composition disclosed in U.S. Pat. No. 6,090,869 comprises: (1) about 40% to about 60% by weight of HYSOL EA 929NA epoxy resin composition; (2) about 5% to about 20% by weight HYSOL SR1000 high solids epoxy resin/solvent mixture; (3) about 2% to about 30% by weight of ARALDITE RD-2 di-epoxide reactive diluent; (4) about 2% to about 20% of ZONYL MP1000 polytetrafluoroethylene powder; (5) about 2% to about 20% by weight molybdenum disulfide powder; and (6) and about 0.5% to about 13% H360 wet ground mica.

U.S. Pat. No. 6,284,322 to Nazaryan et al. discloses a low friction coating composition, comprising (1) about 60 wt % to about 95 wt % of a high temperature epoxy; (2) about 1 wt % to about 30 wt % of molybdenum disulfide; and (3) about 1 wt % to about 20 wt % of polyimide powder, all based on the total weight of the coating composition.

U.S. Pat. No. 6,323,264 to Nazaryan et al. discloses a corrosion barrier coating composition, comprising an admixture of: (1) about 60 to about 95 wt % of a one-component epoxy resin composition comprising (a) about 10–30% by weight of 4-glycidyloxy, N,N-diglycidyl aniline; (b) about 30–60% by weight of an epoxy resin, wherein the epoxy resin is epichlorohydrin ether of bisphenol A; and (c) about 3–7% by weight of strontium chromate; (2) about 1 to about 30 wt % of polytetrafluoroethylene; and (3) about 1 to about 20 wt % of glass powder, all weight percents being based on the total weight of the composition.

Copending U.S. Pat. Ser. No. 08/568,114 discloses a curable composition useful for repairing worn surfaces on housings comprising an admixture of (1) a mixture of (a) at least one one-component epoxy resin, (b) at least one solvent and (c) at least one reactive diluent, wherein the epoxy resin is present in a major (i.e., at least 50% by weight) amount in the mixture; (2) graphite powder; and (3) polytetrafluoroethylene powder.

While the above coating materials may be satisfactory for certain applications, there is still need for improved low-friction coating compositions that have high wear resistance, and that are useful for a wide variety of applications including pump housings and mechanisms, pistons, or other types of reciprocating parts where high wear resistance is required. It is particularly desirable for a self-lubricating coating composition to be free of toxic chromate. The present invention is believed to be an answer to that need.

SUMMARY OF THE INVENTION

In one aspect, the present invention is directed to a low-friction coating composition, comprising: (a) about 10 to about 30 wt % of an epoxy resin composition consisting essentially of 4-glycidyloxy-N,N'-diglycidylaniline; (b) about 30 to about 60 wt % of an epoxide resin composition consisting essentially of bisphenol A diglycidyl ether polymer; and (c) about 20 to about 40 wt % of an aromatic amine composition consisting essentially of 4,4'-sulfonyldianiline; wherein all weight percents are based on the total weight of the low-friction coating composition, and wherein the low-friction coating composition is substantially free of chromate.

In another aspect, the present invention is directed to a substrate coated with the above low-friction coating composition.

In another aspect, the present invention is directed to a method of coating a substrate with a low-friction coating composition, comprising the steps of coating the substrate with the above low-friction coating composition; and curing the low-friction coating composition onto the substrate at a temperature of between 100 and 500° F. for 1–5 hours.

These and other aspects will become apparent from the following written description of the invention.

DETAILED DESCRIPTION OF THE INVENTION

It now has been surprisingly found, in accordance with the present invention, that a solution is provided to the problem of providing a self-lubricating coating composition for use in high stress applications that is substantially free of toxic chromate. The present inventor has ¶¶solved this problem by developing a chromate-free self-lubricating composition that utilizes a specific aromatic amine component as an alternative to chromate. The chromate-free self-lubricating coating composition of the invention is generally made from an epoxy resin composition consisting essentially of 4-glycidyloxy-N,N'-diglycidyl aniline, an epoxide resin composition consisting essentially of bisphenol A diglycidyl ether polymer; and an aromatic amine composition consisting essentially of 4,4'-sulfonyldianiline. All of the above components of the self-lubricating coating composition of the invention are substantially chromate free. In addition to having self-lubricating and low-friction properties, requiring little maintenance, and possessing long life, the lack of chromate in this composition makes it especially attractive for its low level of toxicity.

As defined herein, the phrases "substantially chromate-free" and "substantially free of chromate" are used interchangeably and refer to compositions containing less than 0.01 wt %, and preferably less than 0.005 wt % chromate, based on the total weight of the composition.

As indicated above, the composition of the present invention is an admixture made from an epoxy resin composition consisting essentially of 4-glycidyloxy-N,N'-diglycidyl aniline; an epoxide resin composition consisting essentially of bisphenol A diglycidyl ether polymer; and an aromatic amine composition consisting essentially of 4,4'-sulfonyldianiline. Each of these components is described in more detail below.

As mentioned above, the first component of the self-lubricating coating composition is an epoxy resin composition consisting essentially of 4-glycidyloxy-N,N'-diglycidyl aniline (also known as N-(4-(oxiranylmethoxy)phenyl)-N-(oxiranylmethyl)-oxiranemethaneamine and listed under Chemical Abstracts No.5026-74-4). This component is available commercially from Vantico, Inc. (Brewster, N.Y.) under the trade name ARALDITE MY 0510.

The second component of the self-lubricating coating composition is a liquid epoxide resin composition consisting essentially of bisphenol A diglycidyl ether polymer (also known as 4,4'-(1-methyethylidene)bisphenol polymer and listed under Chemical Abstracts No. 25068-38-6). This component is available commercially from Vantico, Inc. (Brewster, N.Y.) under the trade name ARALDITE GY 6010.

The third component of the self-lubricating coating composition is an aromatic amine composition which functions as a substitute for toxic chromate. The aromatic amine composition consists essentially of 4,4'-sulfonyldianiline (also known as 4,4'-sulfonyl-bis-benzenamine or 4,4'-diaminodiphenyl sulfone, and listed under Chemical Abstracts No. 80-08-0). This component is available commercially from Vantico, Inc. (Brewster, N.Y.) under the trade name ARADUR 976-1.

In the composition of the present invention, the epoxy resin composition preferably comprises from 10 to about 30 wt %, more preferably from about 20 to about 30 wt %, and most preferably from about 25 to about 39 wt %, all weight percentages based on the total weight of the low-friction coating composition. The epoxide resin composition preferably comprises from about 30 to about 60 wt %, more preferably from about 35 to about 55 wt %, and most preferably from about 40 to about 50 wt %, all weight percentages based on the total weight of the low-friction coating composition. The aromatic amine composition preferably comprises from about 20 to about 40 wt %, more preferably from about 25 to about 35 wt %, and most preferably from about 30 to about 35 wt %, all weight percentages based on the total weight of the low-friction coating composition.

In addition to the above ingredients, several optional ingredients may be included in the composition of the present invention, in order to provide or adjust various characteristics to the basic formulation. In one embodiment, amorphous silica may be added to the composition of the present invention in order to increase the viscosity of the composition and thereby reduce "sag" if the composition is applied to a vertical surface. Amorphous silica may be added to the composition of the present invention up to about 10 wt %, and more preferably from between about 6 and about 8 wt %, based on the total weight of the low-friction coating composition. A particularly preferred amount of amorphous silica is 7 wt %.

Maleinized liquid resin may also be added to the low-friction coating composition of the present invention. Maleinized liquid resins allow crosslinking to occur between the polymers of the composition and the maleinized resin, and results in reduced shrinkage and increased toughness of the applied composition. In one embodiment, maleinized polybutadiene (polybutadiene adducted with maleic anhydride) sold under the trade name RICON 130 MA 13, and available commercially from Ricon Resins, Inc. (Grand Junction, Colo.), is used in the composition of the present invention up to about 12 wt %, and more preferably from about 6 to about 8 wt %, based on the total weight of the low-friction coating composition. A particularly preferred amount of maleinized polybutadiene is 7 wt %.

Additional selected fillers may also be included in the low-friction coating composition of the present invention to increase the lubricity of the composition, to increase thermal conductivity, or to enhance electrical conductivity or dielectric resistance. Useful fillers for the present composition include fluorinated grease, polytetrafluoroethylene powder, polytetrafluoroethylene fibers, molybdenum disulfide powder, graphite powder, ceramic powder, mica powder, mica flakes, boron nitride powder, copper/bismuth powder, milled fiberglass, and combinations thereof. In one embodiment, fluorinated grease sold by E. I. du Pont de Nemours and Company (Wilmington, Del.) under the trade name KRYTOX may be used in the composition of the present invention in amounts up to about 15 wt %, and preferably from about 8 to about 12 wt %, based on the total weight of the low-friction coating composition. A particularly preferred amount of fluorinated grease is 10 wt %. Other fillers listed above may be optionally added in amounts from 0 to about 20% by weight of the admixture. The composition may also optionally contain color additives, metal powders, or both. If it is desirable to use a metal powder, then silver powder, copper powder or aluminum powder as well as tungsten selenide, tantalum sulfide, molybdenum diselenide and boron nitride in amounts from about 0.5% to 20% of the composition may be used to achieve different corrosion resistance characteristics for specific applications.

In some applications, such as spray applications, it may be advantageous to thin the low-friction coating composition of the invention with a solvent prior to application so that the material is applied evenly and does not clog the spraying equipment. A useful solvent for this purpose is a combination of 10–40 wt % methyl isobutyl ketone and 60–90 wt % propylene glycol monomethyl ether. Such a solvent is sold by Dexter Electronic Materials (Olean, N.Y.) under the trade name AD2002 Thinner. A useful alternative solvent is methylene chloride. The amount of solvent useful in the composition of the present invention generally depends on factors such as desired evaporation rate, type of spraying or other application equipment, desired thickness of the applied coat, and the like understood and easily determined by those of skill in the art. Nonlimiting useful amounts of solvent useful in the composition of the present invention solvents generally range from about 0 wt % to about 40 wt %, based on the total weight of the composition. Amounts of solvent may also be used outside this preferred range if the particular application so demands.

To prepare the composition, the above materials, as well as any optional ingredients, are preferably mixed together at ambient temperature to form a liquid slurry. Air may be removed from the slurry by mixing under a vacuum. The amount of solvent, if any, added to the slurry is easily determined by those skilled in the art based on the viscosity required for the spray equipment.

The low-friction coating composition may be applied to a variety of substrates such as magnesium or magnesium alloys, aluminum or aluminum alloys, stainless steel, titanium alloys, brass alloys, nickel alloys such as INCONEL and MONEL available from Special Metals Corporation (New Hartford, N.Y.), carbon steel, and the like. Also, non-metallic substrates such as plastics may be used as substrates. One family of preferred substrates are magnesium, aluminum or stainless steel fuel pump, oil pump, or actuator housings. Besides its preferred use on various housings, the low-friction coating composition of the invention may also be used to coat new parts or repair housing parts on pistons, gear boxes, cover assemblies, valve bodies, cylinders, shafts, bearings, impellers and journals. The composition of the present invention may also be applied onto and interspersed within a metallic mesh resulting in flexible planar sheeting.

In order to ensure adequate bondability and repeatability of the desired products of the coated substrate, metal substrate surfaces to be coated are preferably cleaned and then roughened by grit blasting with a media sufficient to produce surface roughness of 250 RMS (root-mean-square) without exaggerating the peaks and valleys of the undamaged or damaged surface. If grit blasting is employed, the surface is also preferably scrubbed before coating with the composition of the present invention to remove any embedded grit media. The roughened surface may also be preferably subjected to a chemical cleaning before the coating operation.

The low-friction coating composition of the invention may be applied by brush, spatula, spray, low pressure transfer, casting, or other suitable application method. Preferably, the amount of low-friction coating composition slurry applied to the substrate is in the range of about 0.010 inch (10 mil) to about 0.050 inch (50 mil) in thickness when wet. Since the composition of present invention is in a slurry state before being cured, it can be readily applied onto any surface, including inner diameters and spherical surfaces. For simple shapes, these compositions can be molded into a solid form on a substrate or machined from a solid bar on a substrate into the desired final configuration. For larger surfaces, these compositions may be sprayed onto a substrate and then cured.

After being applied, the corrosion barrier composition that is applied to the substrate is cured by heating the coated substrate to suitable curing temperature for a sufficient amount of time. In order to achieve strong bonding to the substrate, the preferred curing temperatures are from about 100 to about 500° F., and more preferably from about 200 to about 400° F., for between 1 and 5 hours, and more preferably from between 2 and 4 hours. A particularly useful curing temperature is 350° F. The cured coating composition may be used as cured on the substrate, or, in certain applications, may be machined to a desired thickness or shape.

The low-friction coating composition of the present invention offers several significant commercial advantages. The composition is substantially free of chromate, and therefore is less toxic than chromate-containing composition. In addition, the compositions are inexpensive to prepare, and are useful in a wide variety of applications where good adherence to the substrate and a thicker, uniform coat of coating composition is required. The compositions can be applied by simple procedures, such as spatula or spraying using common equipment and methods. The compositions are also compatible with a wide variety of substrate materials and configurations, and they have the ability to be machined by either conventional single point tooling, grinding, honing or polishing operations. Furthermore, the viscosity of the compositions of the present invention can easily be adjusted by varying the amounts of the individual components or by addition of amorphous silica or solvent. The compositions of the present invention also do not require bonding pressures to ensure excellent adhesion to substrates. The composition of the present invention also has a long storage life (approximately one year) when stored at 30° F. or below.

EXAMPLES

The following Examples are provided to better illustrate the present invention. All parts and percentages are by weight and all temperatures are degrees Fahrenheit, unless explicitly stated otherwise.

Example 1

Preparation and Evaluation of a Chromate-Free Low-Friction Coating Composition

A. Preparation of the Coating Composition

In a metallic crucible, 45 parts by weight of bisphenol A diglycidyl ether polymer (ARALDITE GY 6010 from Vantico), 25 parts by weight of 4-glycidyloxy-N,N'-diglycidyl aniline (ARALDITE MY 0510 from Vantico), and 30 parts by weight of 4,4'-sulfonlydianiline (ARADUR 976-1 from Vantico) was hand mixed in a bell jar under vacuum (29 inches Hg). The total weight of the composition was 10 grams. To this mixture was added 0.7 grams amorphous silica, and the resulting combination was thoroughly mixed. 1.0 gram molybdenum disulfide powder (Z MOLY powder from Dow Coming, Midland, Mich.) and 0.5 grams polytetrafluoroethylene powder (MP 1200 from DuPont Fluoroproducts, Wilmington, Del.) were subsequently added and mixed into the composition.

The above composition was applied to an aluminum disk 1.5 inches diameter and ¼ inch thick that had previously been grit blasted and chemically etched. The above composition was applied to approximately 0.030 inch thick, and cured in an air circulating oven for two hours at 350° F. Following curing, the coated disk was cooled to room temperature and evaluated as described below.

B. Wear Evaluation of the Coating Composition

Wear evaluation of the coating was undertaken following machining of the cured composition. Machining of the cured composition was performed with a single point tool and resulted in a coating that was approximately 0.010 inch thick and approximately 0.75 inches in diameter. The evaluation was conducted utilizing a modified drill press which was configured to apply a rotating load of approximately 200 lbs (400 PSI) at the point of contact with the cured composition on the disk. The rotary speed was adjusted to approximately 325 rpm (45 ft/min), and the coated disk was subjected to the following forces:

| | |
|---|---|
| Velocity | 45 ft/min |
| Pressure | 400 psi |
| PV | 18,000 |

In the above table, "PV" is the product of the velocity and pressure values, and is a relative measure of the performance of the composition. The wear testing was conducted for approximately 480 minutes. Measurements were taken with a caliper before and after the testing. Following completion of the evaluation, the specimen did not show any deleterious effects and had less than 0.1 mil wear.

C. Clamped Compression Evaluation

The coated disk was also subjected to Clamped Compression testing at ambient and elevated temperatures. The same formulation described in (A) above was applied and cured to a 2-inch steel disk having a ½ inch hole in the center. Following curing, the coating was machined to a thickness of 0.010 inch, an outer diameter of 1 inch, and an inner diameter of ⅝th inch. A matching uncoated steel disk was clamped to the coated disk using a ½ inch bolt, and tightened to 150 ft-lbs (4000 lbs) resulting in compressive stress of 9000 psi. The height of the clamped stack was measured initially and after 3 hours of compression at ambient conditions, and no change in dimension was observed. The stack was then placed in an air circulating oven at 500° F. for 3 hours. Following cooling, no change in the thickness dimensions were observed, and no discernable surface effects were observed upon disassembly of the disks.

Example 2

Preparation and Evaluation of a Chromate-Free Low-Friction Coating Composition Containing a Crosslinker The composition described in Example 1 was modified by adding 5 wt % maleinized polybutadiene (RICON 130 MA 13, Ricon Resins, Inc., Grand Junction, Colo.) as a crosslinker. This composition was prepared, applied, and cured to the same type of aluminum disk described in Example 1. Following curing, the modified composition was evaluated using the same Wear Evaluation test described above. Following completion of the evaluation, the modified coating composition did not show any deleterious effects and had less than 0.1 mil wear.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entireties.

What is claimed is:

1. A low-friction coating composition, comprising:
   A. about 10 to about 30 wt % of an epoxy resin composition consisting essentially of 4-glycidyloxy-N,N'-diglycidylaniline;
   B. about 30 to about 60 wt % of an epoxide resin composition consisting essentially of bisphenol A diglycidyl ether polymer; and
   C. about 20 to about 40 wt % of an aromatic amine composition consisting essentially of 4,4'-sulfonyldianiline;
   wherein all weight percents are based on the total weight of said low-friction coating composition, and wherein said low-friction coating composition is substantially free of chromate.

2. The low-friction coating composition of claim 1, wherein said epoxy resin composition comprises from about 20 to about 30 wt %, based on the total weight of said low-friction coating composition.

3. The low-friction coating composition of claim 1, wherein said epoxy resin composition comprises from about 25 to about 30 wt %, based on the total weight of said low-friction coating composition.

4. The low-friction coating composition of claim 1, wherein said epoxide resin composition comprises from about 35 to about 55 wt %, based on the total weight of said low-friction coating composition.

5. The low-friction coating composition of claim 1, wherein said epoxide resin composition comprises from about 40 to about 50 wt %, based on the total weight of said low-friction coating composition.

6. The low-friction coating composition of claim 1, wherein said aromatic amine composition comprises from about 25 to about 35 wt %, based on the total weight of said low-friction coating composition.

7. The low-friction coating composition of claim 1, wherein said aromatic amine composition comprises from about 30 to about 35 wt %, based on the total weight of said low-friction coating composition.

8. The low-friction coating composition of claim 1, further comprising up to about 10 wt % amorphous silica, based on the total weight of said low-friction coating composition.

9. The low-friction coating composition of claim 8, wherein said amorphous silica comprises about 6 to about 8 wt %, based on the total weight of said low-friction coating composition.

10. The low-friction coating composition of claim 1, further comprising a filler selected from the group consisting of fluorinated grease, polytetrafluoroethylene powder, polytetrafluoroethylene fibers, molybdenum disulfide powder, graphite powder, ceramic powder, mica powder, mica flakes, boron nitride powder, copper/bismuth powder, milled fiberglass, and combinations thereof.

11. The low-friction coating composition of claim 10, wherein said fluorinated grease comprises up to about 15 wt %, based on the total weight of said low-friction coating composition.

12. The low-friction coating composition of claim 10, wherein said fluorinated grease comprises from about 8 to about 12 wt %, based on the total weight of said low-friction coating composition.

13. The low-friction coating composition of claim 1, further comprising a solvent.

14. The low-friction coating composition of claim 13, wherein said solvent comprises from about 0 wt % to about 40 wt %, based on the total weight of the composition.

15. The low-friction coating composition of claim 13, wherein said solvent comprises an admixture of about 10–40 wt % methyl isobutyl ketone and about 60–90 wt % propylene glycol monomethyl ether.

16. The low-friction coating composition of claim 13, wherein said solvent is methylene chloride.

* * * * *